Figure 1:
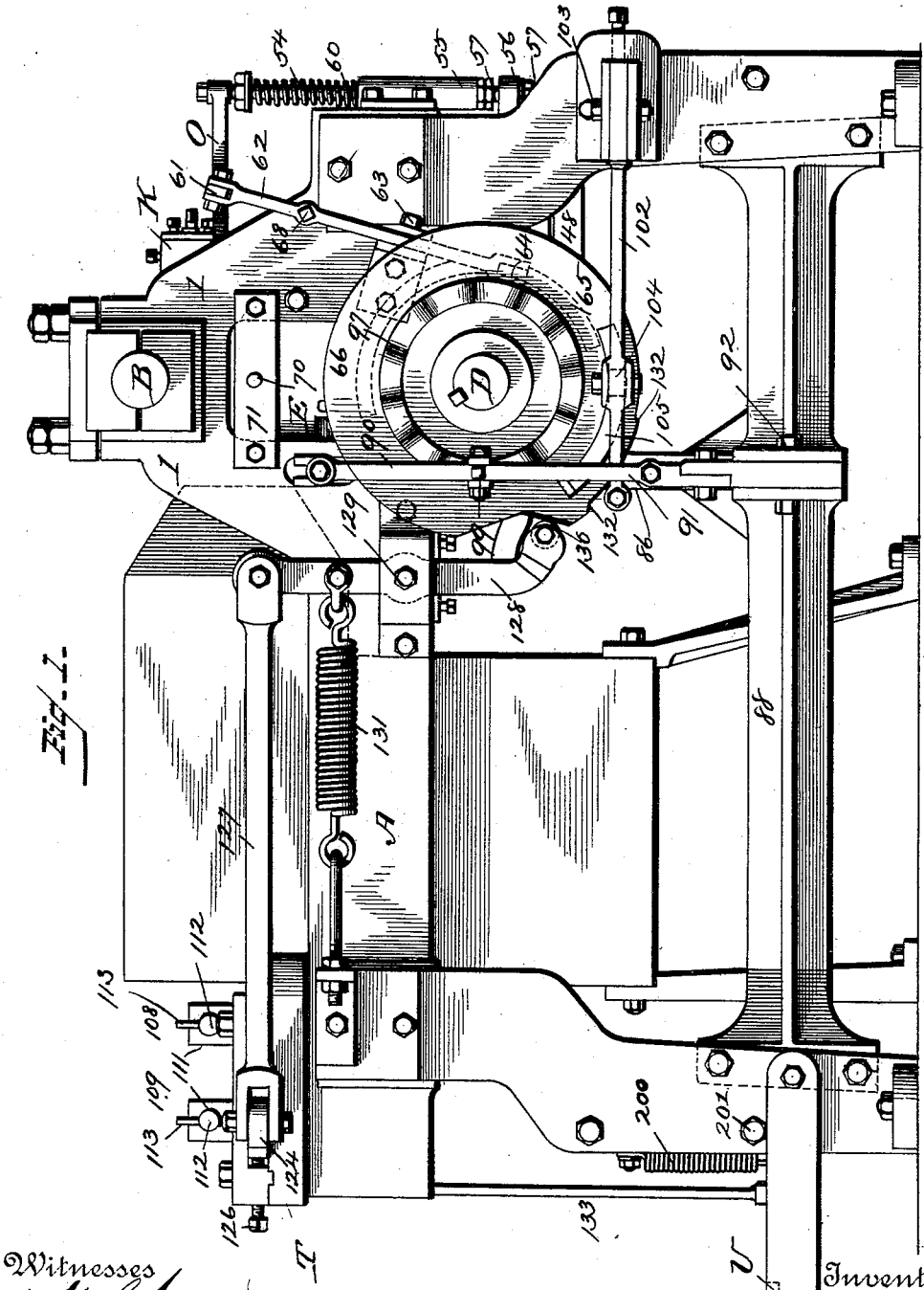

(No Model.) 14 Sheets—Sheet 1.
D. F. WILLIAMS.
MACHINE FOR MAKING HORSESHOE NAILS.
No. 484,836. Patented Oct. 25, 1892.

Witnesses
Inventor
David F. Williams
By his Attorney
Franklin H. Hough (No Model.) 14 Sheets—Sheet 2.
D. F. WILLIAMS.
MACHINE FOR MAKING HORSESHOE NAILS.
No. 484,836. Patented Oct. 25, 1892.

(No Model.)

14 Sheets—Sheet 4.

D. F. WILLIAMS.
MACHINE FOR MAKING HORSESHOE NAILS.

No. 484,836.

Patented Oct. 25, 1892.

Witnesses
Wm. H. Schneider
P. J. Rogers

Inventor
David F. Williams
By his Attorney
Franklin H. Hough (No Model.) 14 Sheets—Sheet 5.
D. F. WILLIAMS.
MACHINE FOR MAKING HORSESHOE NAILS.

No. 484,836. Patented Oct. 25, 1892.

Witnesses
Inventor
David F. Williams
By his Attorney
Franklin H. Hough (No Model.) 14 Sheets—Sheet 7.

D. F. WILLIAMS.
MACHINE FOR MAKING HORSESHOE NAILS.

No. 484,836. Patented Oct. 25, 1892.

Witnesses
Inventor
David F. Williams
By his Attorney
Franklin H. Hough (No Model.) 14 Sheets—Sheet 8.
D. F. WILLIAMS.
MACHINE FOR MAKING HORSESHOE NAILS.
No. 484,836. Patented Oct. 25, 1892.
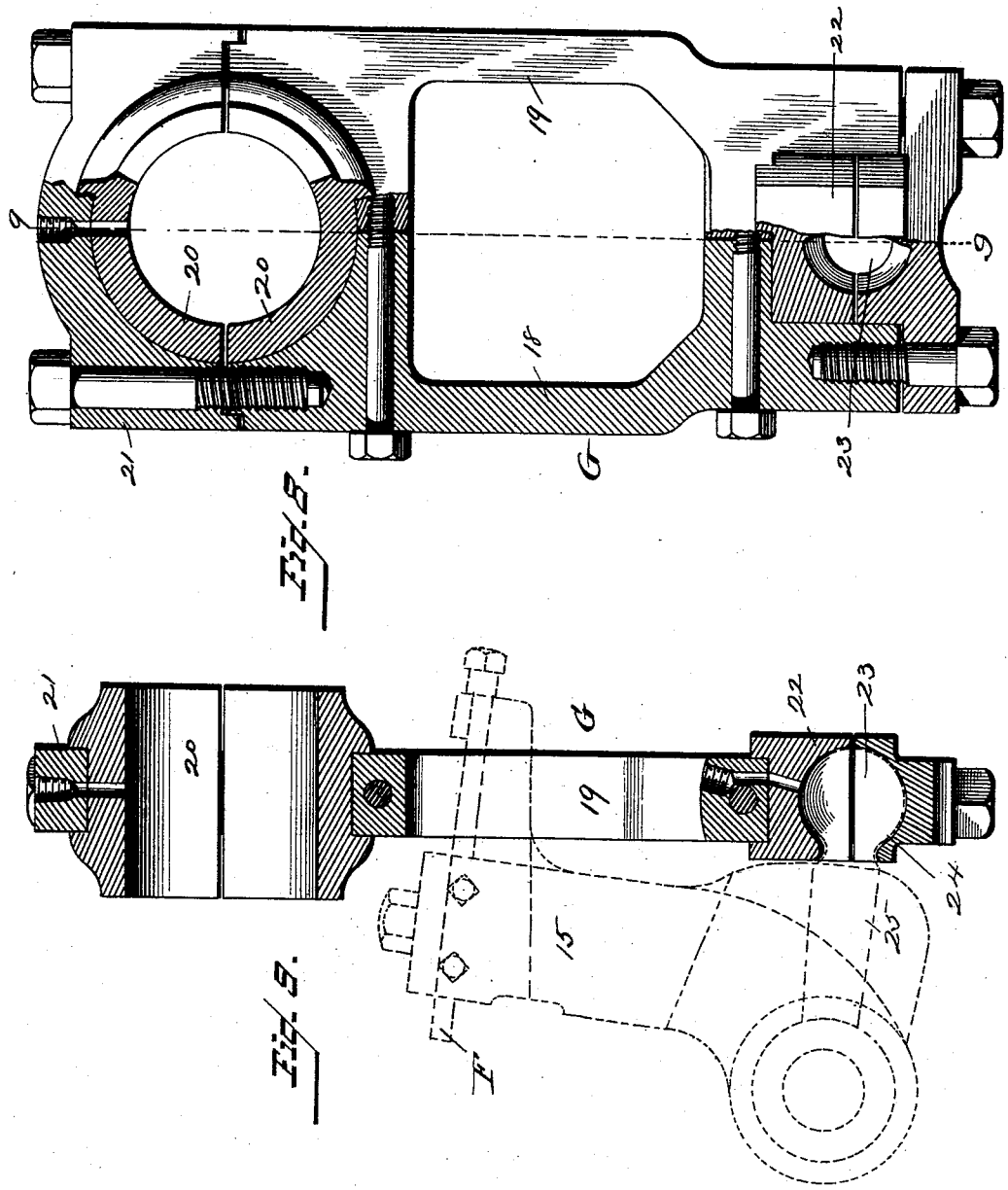

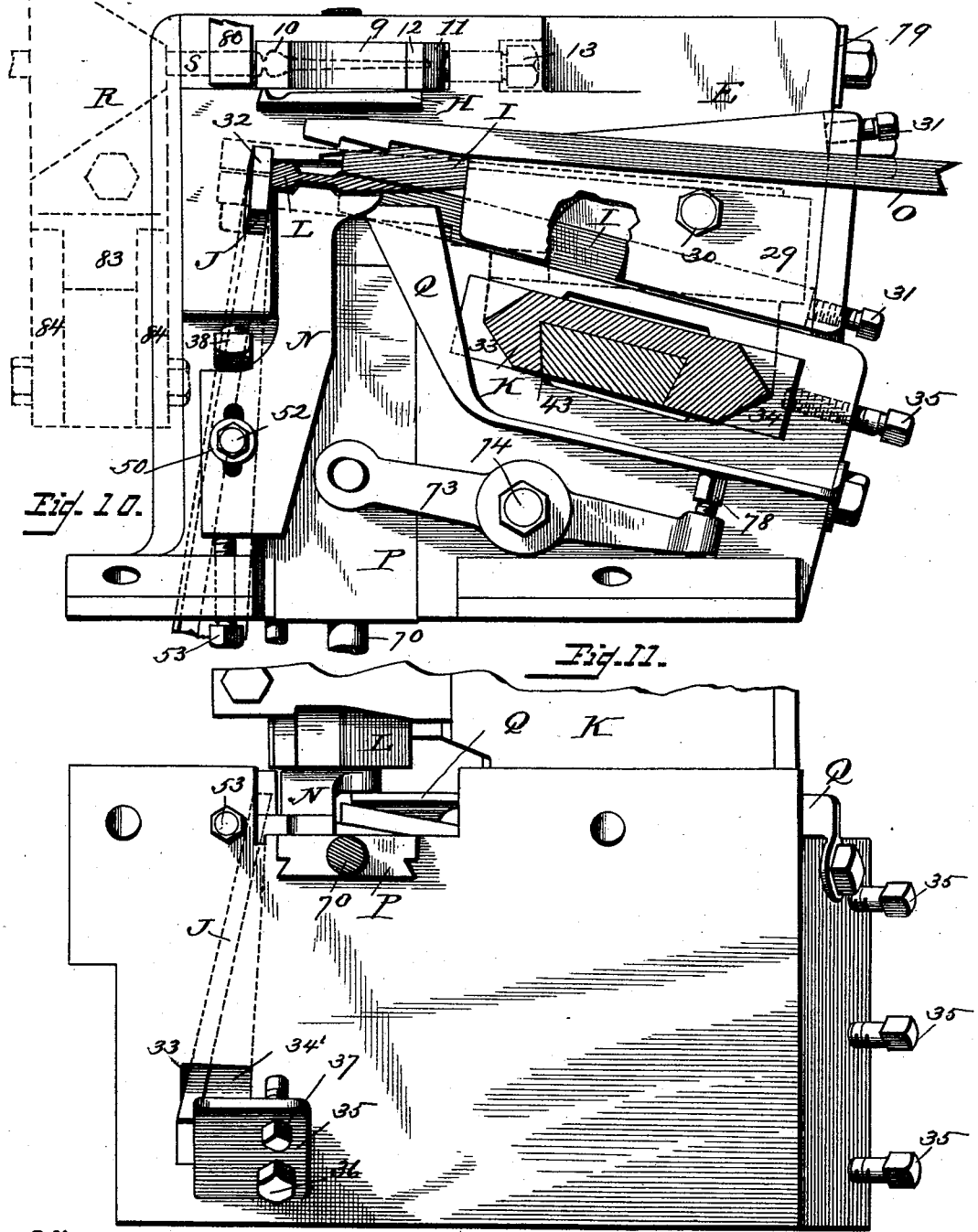

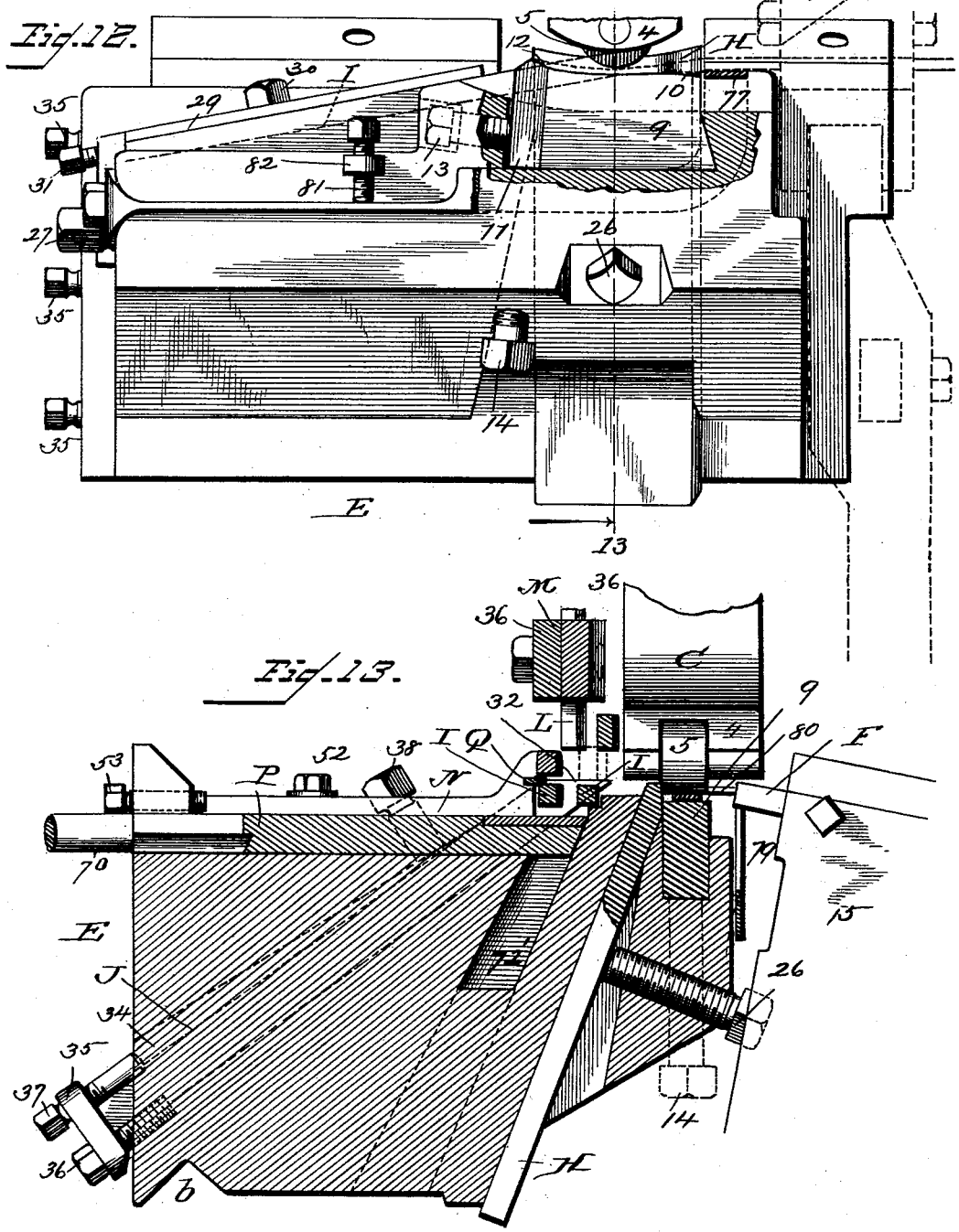

(No Model.) 14 Sheets—Sheet 11.
D. F. WILLIAMS.
MACHINE FOR MAKING HORSESHOE NAILS.
No. 484,836. Patented Oct. 25, 1892.
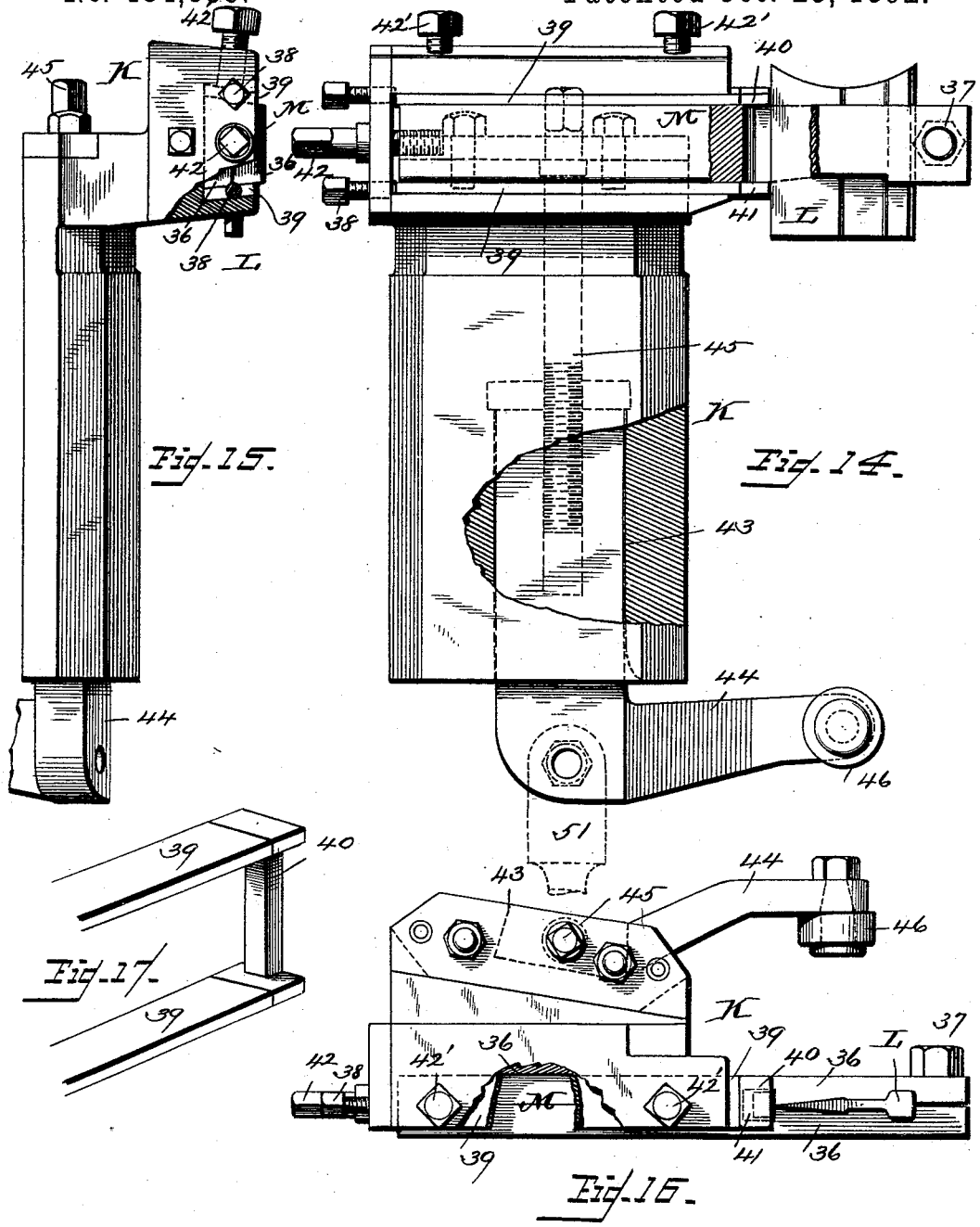
Witnesses
Inventor
David F. Williams
By his Attorney
Franklin H. Hough (No Model.)
14 Sheets—Sheet 12.
D. F. WILLIAMS.
MACHINE FOR MAKING HORSESHOE NAILS.
No. 484,836. Patented Oct. 25, 1892.
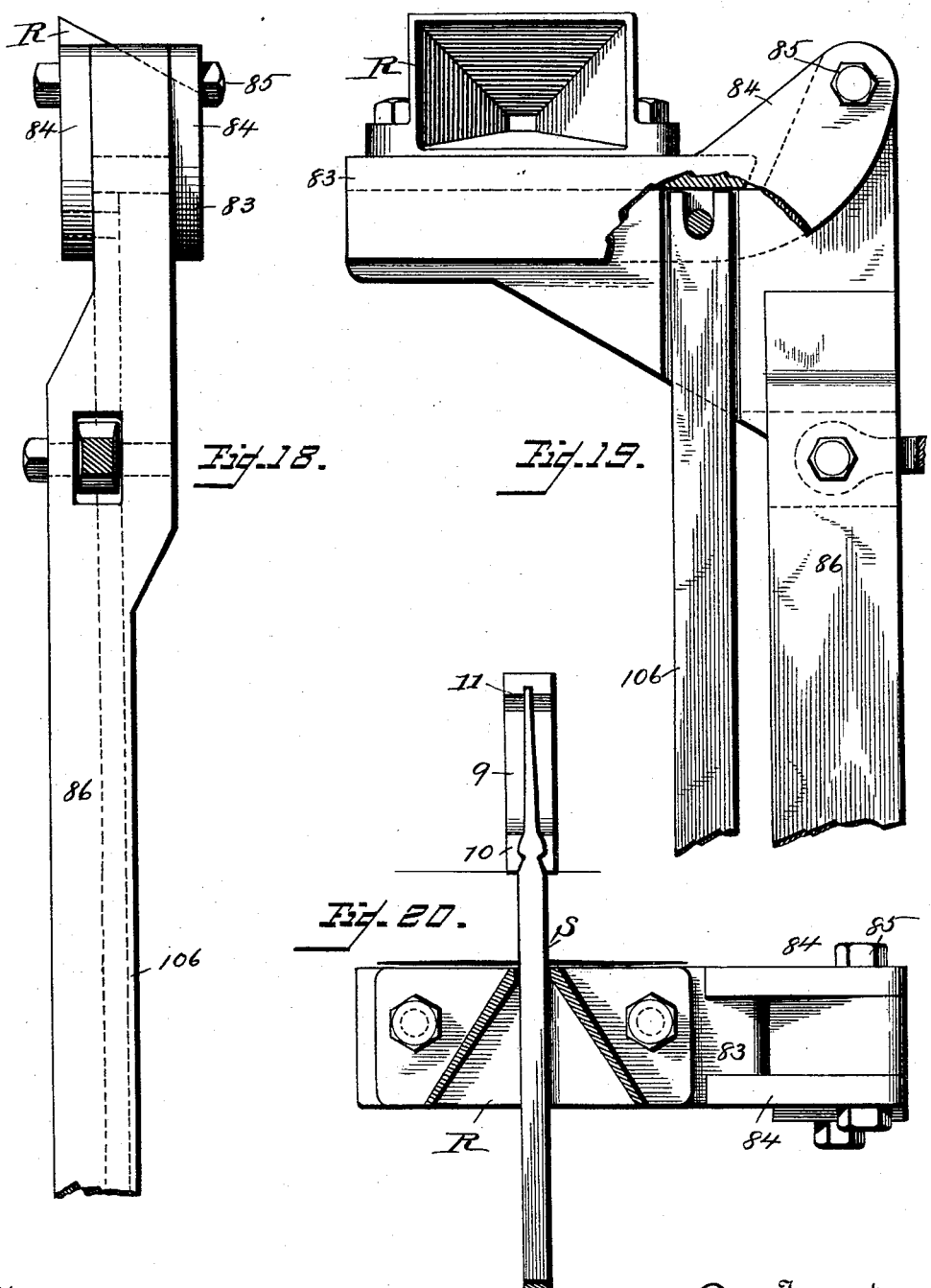

(No Model.) 14 Sheets—Sheet 13.
D. F. WILLIAMS.
MACHINE FOR MAKING HORSESHOE NAILS.
No. 484,836. Patented Oct. 25, 1892.
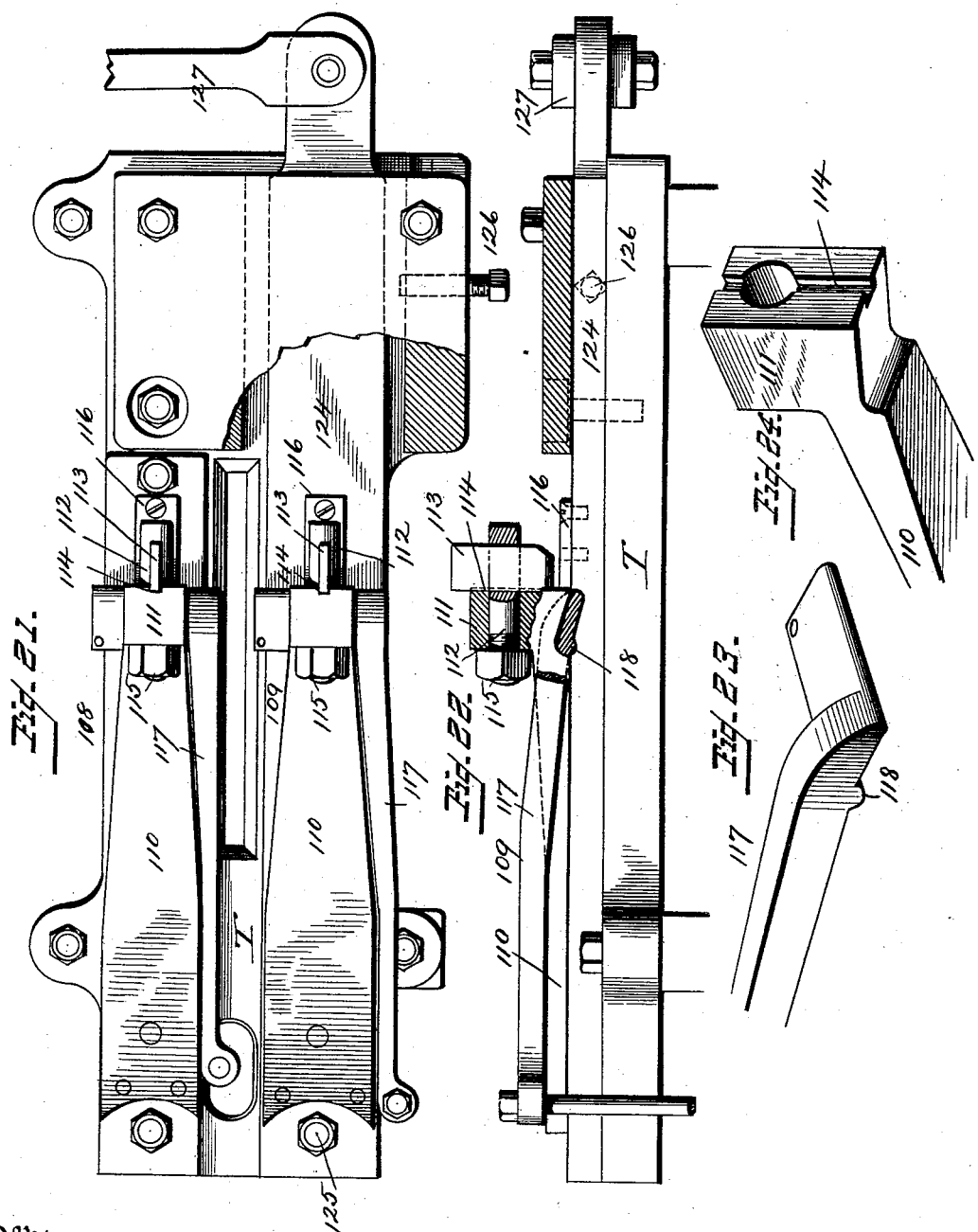

(No Model.) 14 Sheets—Sheet 14.
D. F. WILLIAMS.
MACHINE FOR MAKING HORSESHOE NAILS.
No. 484,836. Patented Oct. 25, 1892.
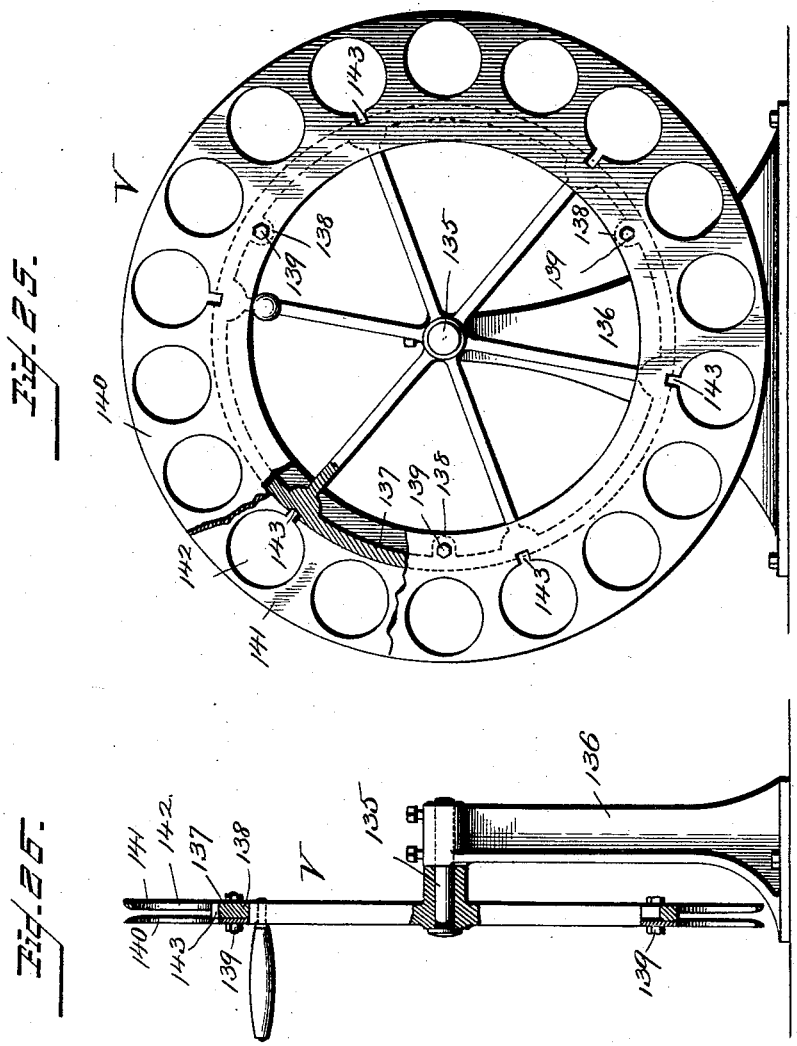

UNITED STATES PATENT OFFICE.

DAVID F. WILLIAMS, OF ALBANY, NEW YORK, ASSIGNOR TO THE ALBANY HORSE NAIL COMPANY, OF SAME PLACE.

MACHINE FOR MAKING HORSESHOE-NAILS.

SPECIFICATION forming part of Letters Patent No. 484,836, dated October 25, 1892.

Application filed January 8, 1892. Serial No. 417,372. (No model.)

*To all whom it may concern:*

Be it known that I, DAVID F. WILLIAMS, a citizen of the United States, residing at Albany, in the county of Albany and State of New York, have invented certain new and useful Improvements in Machines for Making Horseshoe-Nails; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in the manufacture of horseshoe-nails by what is known as "forging"—that is, by a gradual reduction of a nail-rod to the required shape; and my invention consists in the mode and means hereinafter set forth, whereby the end of the stationary rod is rapidly formed into the shape of a finished nail, beveled, pointed, and ready to drive, or into a nail-blank to be finished by subsequent operations, and the finished blank then detached from the rod.

The present invention is in some particulars similar to that described in Patent No. 399,226, granted to me on March 5, 1889.

The special object of my invention is to rapidly forge the blanks or produce nails of uniform size, length, and shape with compact and well-finished points and finish the nail when it is severed from the rod.

The forging-machines heretofore used may be separated into three classes; first, those which fashion the nail between dies, commonly rolling-dies; second, those which fashion the nail between impacting dies or hammers, and, third, those which fashion the nail by successive blows from a roller of small diameter carried on a revolving shaft. I do not deem it necessary to describe the difference in effect which these modes exert upon the metal under treatment. It will be sufficient to point out that my invention belongs to the third class, and that in connection with the striking-hammer the blows of the small roller carried upon the revolving shaft over a stationary anvil closely simulates in its method and effect the blow of the hand-hammer upon metal resting upon a stationary anvil, because its first impact is against the nail-rod at a distance from the end and its action is upon the iron in a direction from the place of impact forward toward said end. The iron is thereby drawn out in front of the advancing roller just as the iron is drawn out in front of the hand-hammer, the blows of which are delivered successively, advancing toward the point; but the herein-described machine is distinguished from said machines primarily by the fact that said machines stop short of completing the nail at one operation, while the machine which forms the subject-matter of the present specification will point, bevel, and straighten the nail, and thereby overcome the necessity of finishing the nails by subsequent operation.

One object of this invention is to provide means whereby a minimum motion is imparted to the nail-rod in order to bring it to the cutters and feed it forward automatically to a distance determined by the length of the nail to be made, said distance being made variable by an adjustable stop device, so that nails of varying lengths may be forged in one and the same machine, and the invention has for its further object certain improvements in the manner of operating said feeding devices, as well as the releasing of the rod when it is desired to move the same.

The invention has for a further object to save the usual labor incident to preheating short nail-rods and carrying such rods at comparatively-short intervals from the preheating-furnace to the machine. This I accomplish by providing a reel upon which is placed a coil of continuous nail-rod, the end of which is passed and fed automatically through a furnace placed upon the machine, and so constructed as to give sufficient heat to heat the end of the nail-rod from which the nails are forged to the proper temperature when it reaches the forging mechanism.

To these ends and to such others as the invention may pertain, the same consists in the combination, with a forging device, of a combined anvil and beveler; in the combination, with the forging and finishing devices, of mechanism for carrying the nail end of the rod from one to the other of said devices; in the combination, with the forging device, of a reel for the reception of a continuous nail-rod, and a furnace for heating the rod and maintaining the proper temperature; and in the combination, with the forging mechanism, of feeding devices and a device for holding the nail-rod during the operation of forging and finishing and severing the nails from the rod; in the combination, with the forging device, of a punch and dies which fashion the point of the nail when it is severed from the rod and the stationary and movable guides which serve to hold the point in position during said operation.

The invention consists, finally, in certain details of construction and in combinations of co-operating parts or elements, substantially as hereinafter described, shown in the accompanying drawings, and then specifically defined in the appended claims.

The invention is clearly illustrated in the accompanying drawings, which, with the letters of reference marked thereon, form a part of this specification, like letters and figures of reference indicating the same parts throughout the several views, and in which drawings—

Figure 2:
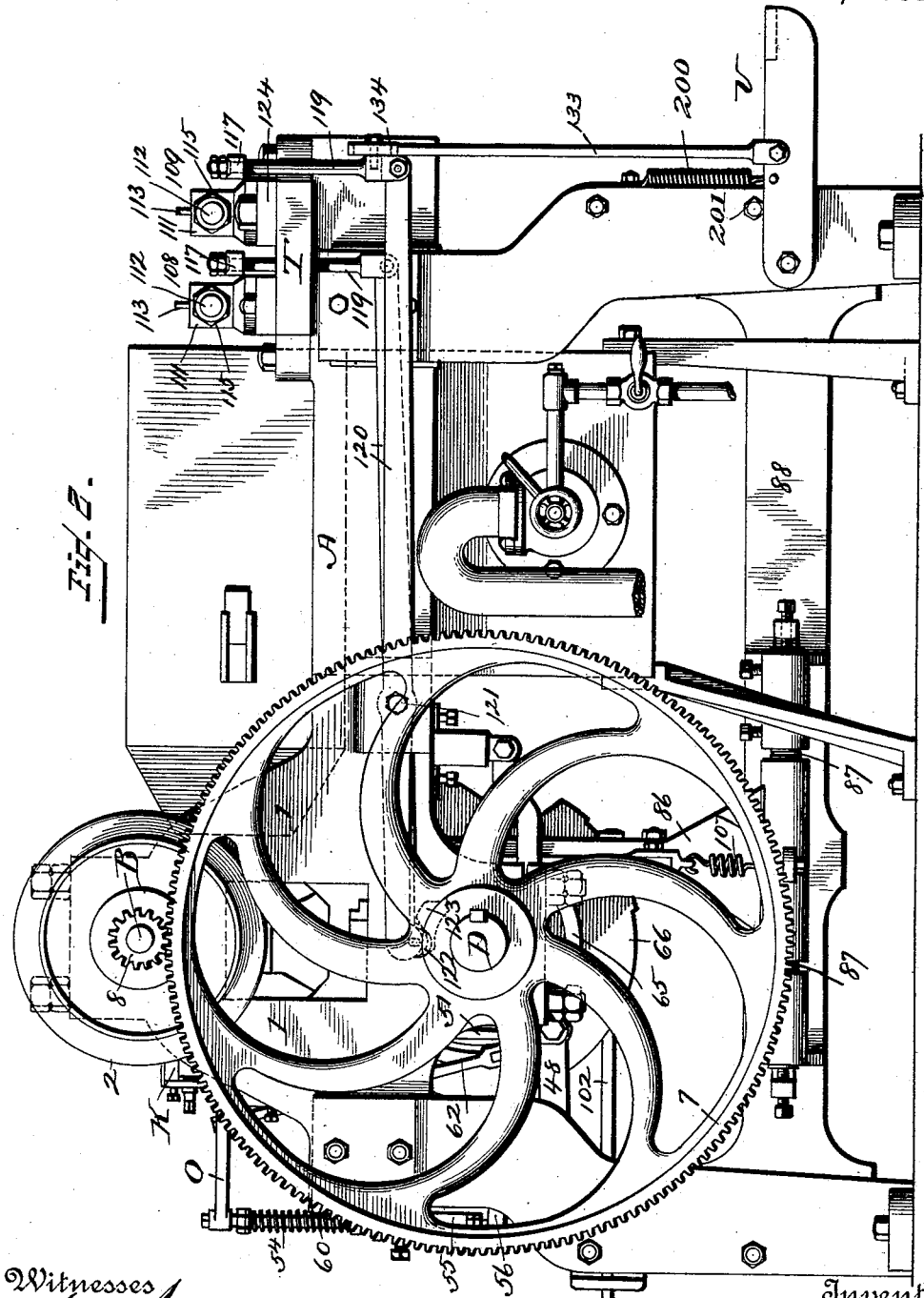
Figure 3:
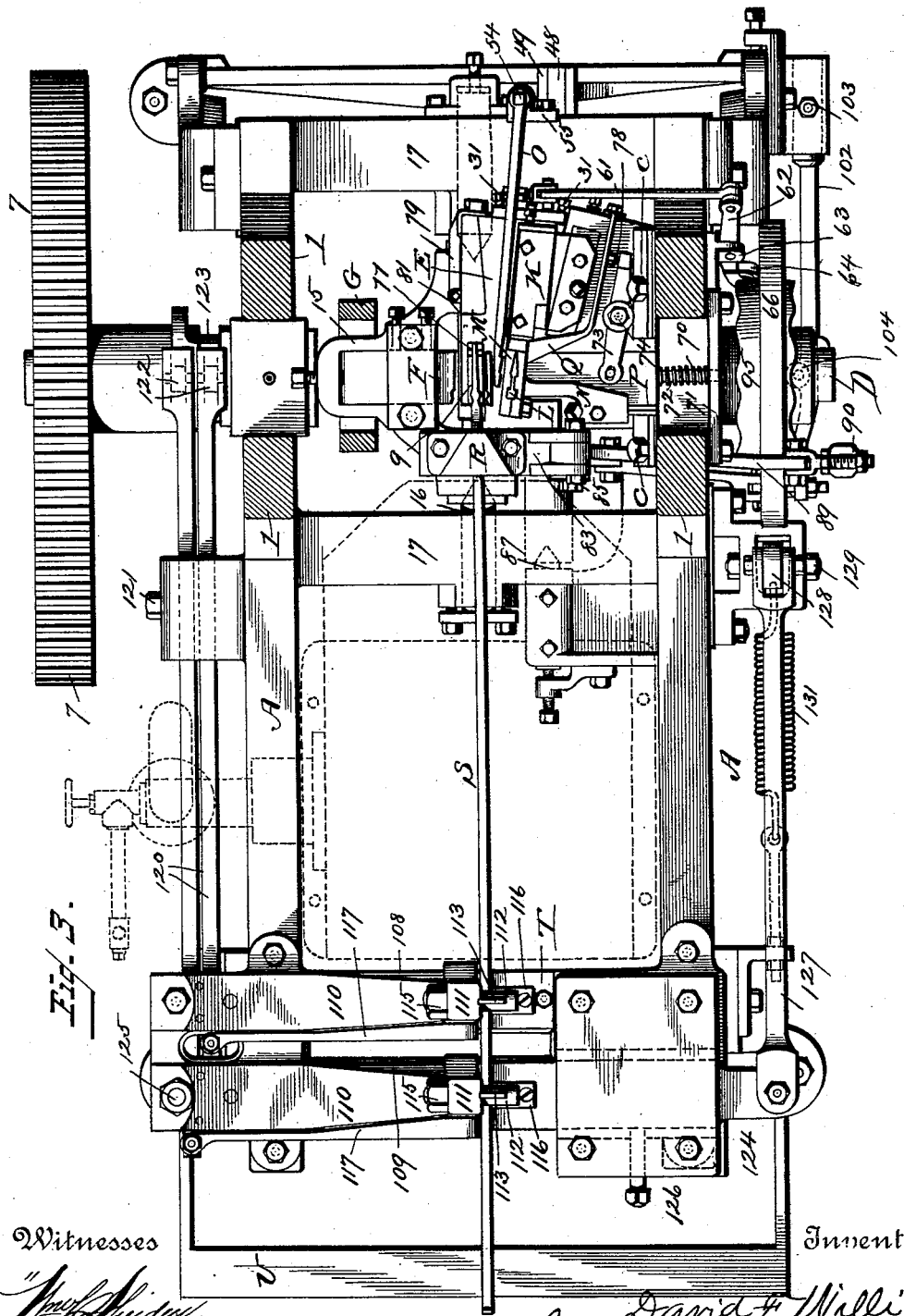
Figure 4:
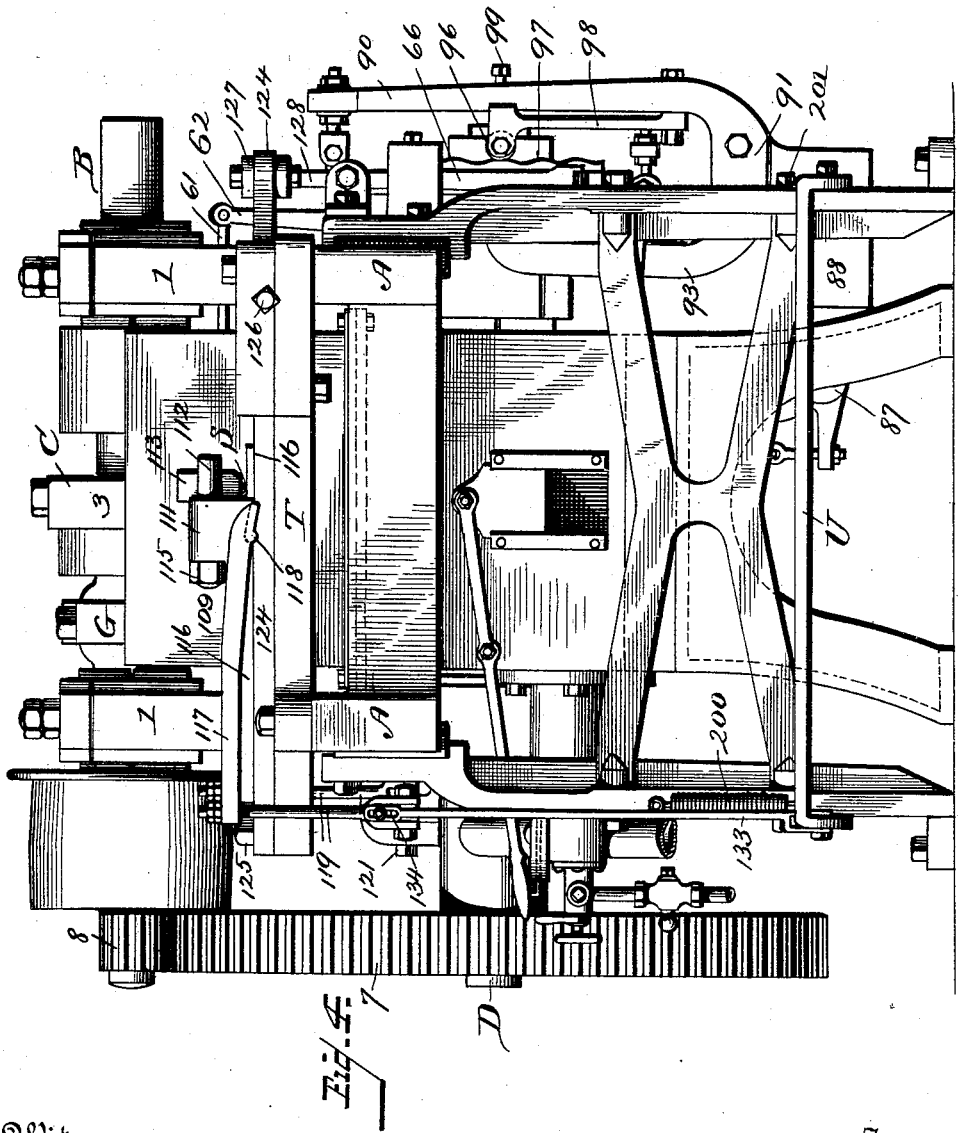
Figure 5:
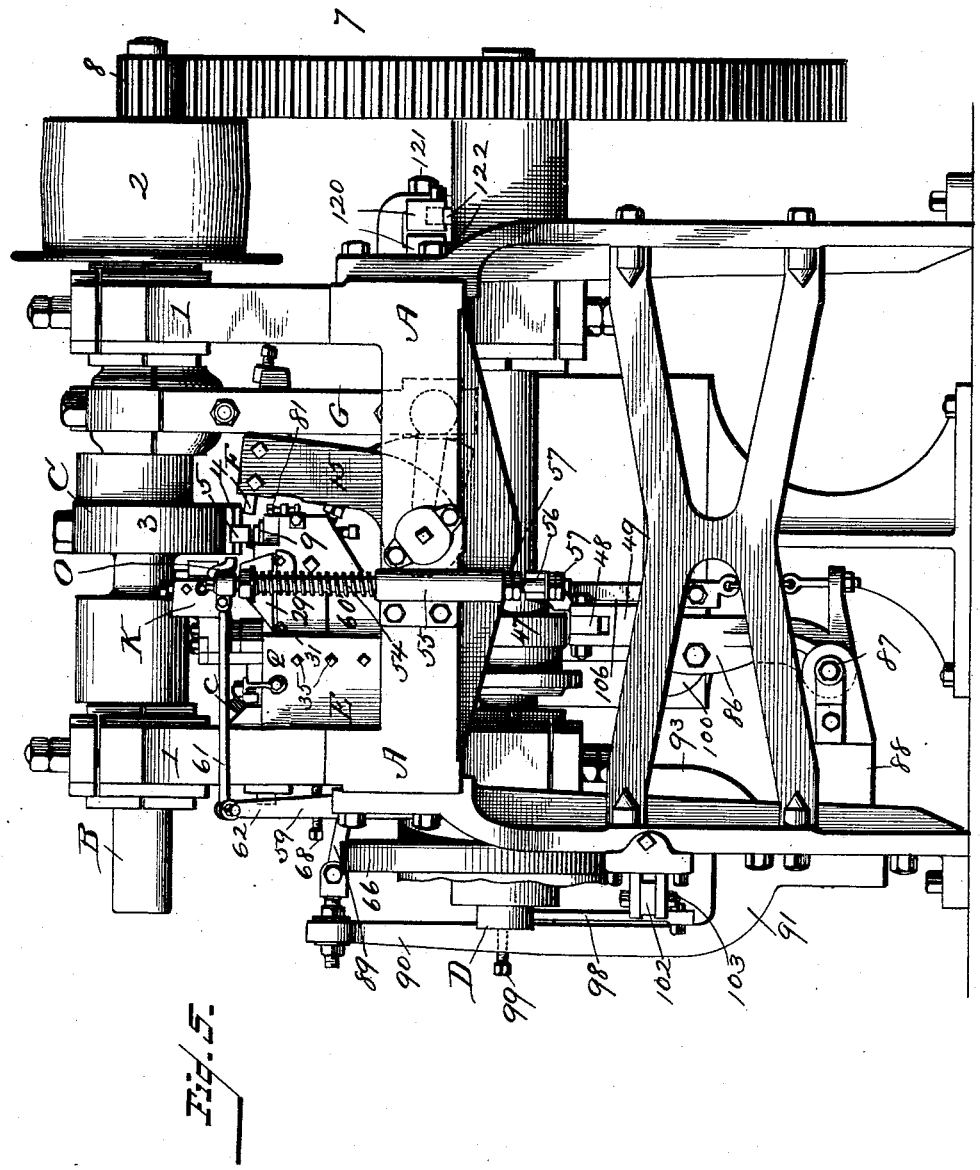
Figure 6:
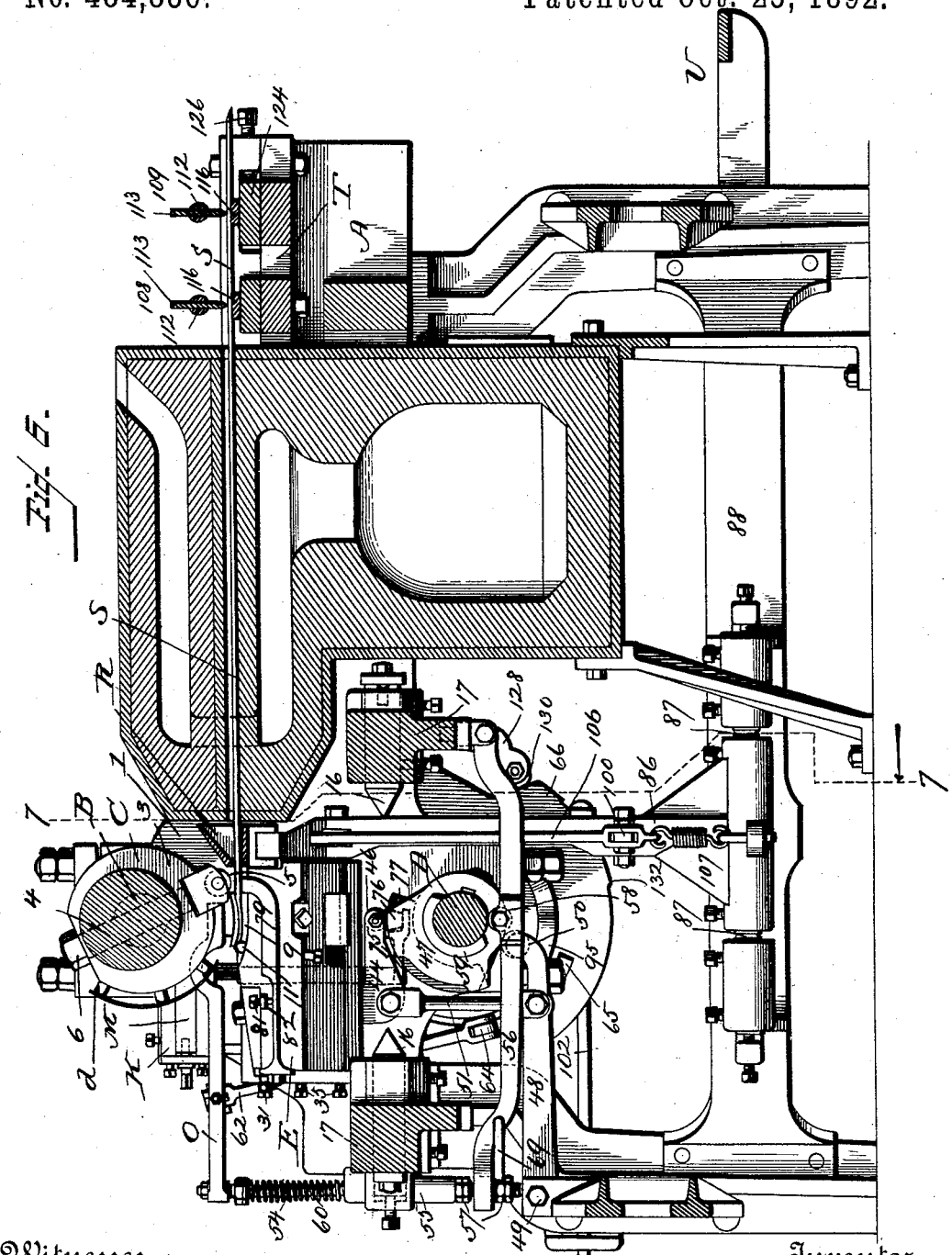
Figure 7:
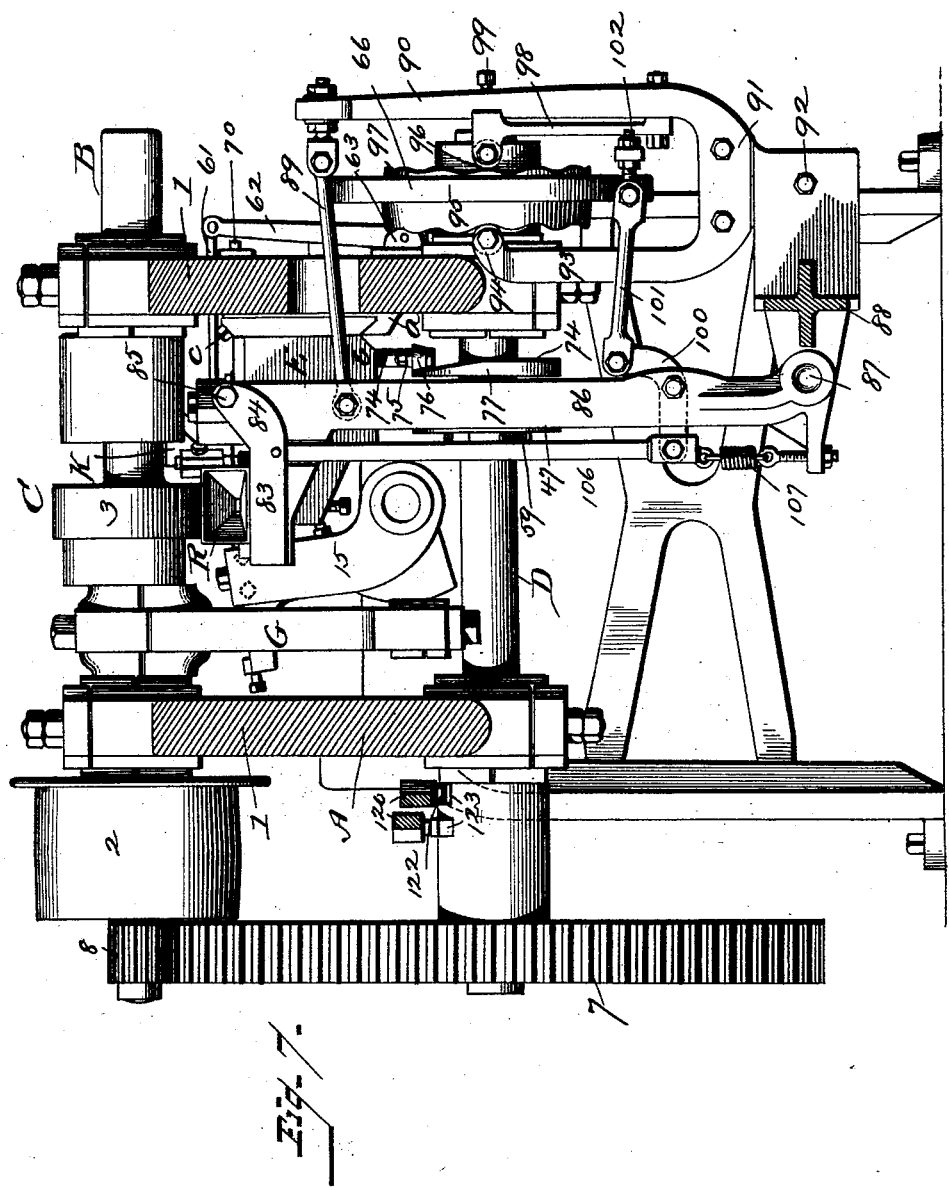

Figure 1 is a side elevation of one side of a nail-making machine embodying my improvements. Fig. 2 is a like view of the opposite side of the machine. Fig. 3 is a top plan view of the machine with the main shaft removed in order to more clearly show the operating parts of the machine. Fig. 4 is a front view of the machine. Fig 5 is a rear view of the same. Fig. 6 is a central vertical longitudinal section through the machine. Fig. 7 is a transverse section of the machine on the line 7 7 of Fig. 6. Fig. 8 is an enlarged detail view of the pitman for operating the striking-hammer carrying the movable die. Fig. 9 is a section on the line 9 9 of Fig. 8. Fig. 10 is an enlarged detailed plan view of the die-block and the various portions of the forging mechanism connected therewith. Fig. 11 is a side elevation of the same. Fig. 12 is a like view of the opposite side. Fig. 13 is a transverse section through the die-block upon the line 13 13 of Fig. 12. Fig. 14 is a side elevation of the punch-carrier, the same being shown upon an enlarged scale. Fig. 15 is a rear view of the same. Fig. 16 is a plan view of the same. Fig. 17 is a detailed perspective view of the horizontal gibs and adjusting-block. Fig. 18 is a side elevation of the upper portion of the nose-piece carrier upon an enlarged scale. Fig. 19 is a front elevation of the same, also upon an enlarged scale. Fig. 20 is a plan view of the same, partly in in section, showing the end of the nail-rod held in position upon the anvil. Fig. 21 is a detail plan view, upon an enlarged scale, of the gripper and feeding mechanism. Fig. 22 is a front view of the same, partly in section. Figs. 23 and 24 are detailed views of portions of the gripper and feeding mechanism. Fig. 25 is a side elevation of the nail-rod reel, the same being shown partly in section. Fig. 26 is a section through the same.

Reference now being had to the details of the drawings by letter, A designates the main or supporting frame of the machine, which may be of any suitable construction adapted to receive and sustain the operating parts.

1 1 designate standards rising from the main frame near its rear end, said standards being provided with journal-bearings for the main or driving shaft B.

B designates the main or driving shaft, provided at its outer end with drive-pulley 2 and about midway between its bearings with roller-hammer C. The roller-hammer C consists of a disk 3, secured to the main shaft and provided with a diametrical opening, through which passes the roller-stock 4, said roller-stock being enlarged and recessed at one end to receive the small roller 5, which comes in direct contact with the nail-rod when the blow is imparted. The enlarged portion of the roller-stock is square and enters a correspondingly-shaped recess in the periphery of the disk 3, thus preventing the roller-stock from turning. The opposite end of the roller-stock is screw-threaded and is provided with a nut 6, by means of which the hammer is readily adjusted.

D designates the counter-shaft, journaled in bearings secured to the sides of the main frame A, motion being imparted to said shaft by means of the gear-wheel 7, secured to its outer end, meshing with the pinion 8 on the outer end of the main drive-shaft. The shaft D is directly under the main shaft and is provided with a series of cams, the offices of which will hereinafter appear.

E designates the die-block, formed of solid metal and provided with recesses and guideways for the reception of the parts of the forging mechanism to be presently described. The die-block is supported by a V-shaped rest $a$ on the side of the main frame A, said rest entering a correspondingly-shaped recess $b$, formed in the under side of the block, being held in place by bolts $c$, passing through its upper edge into the main frame.

9 is the solid stationary anvil, upon which the nail is forged. It is secured in a dove-tailed seat formed in the upper face of the die-block and lies directly in the plane of revolution of the roller-hammer C, the roller 5 of which comes within a short distance (the thickness of a nail) of the upper surface of said anvil. The upper face of the anvil is concave with a slightly-flattened portion 10 at its front end to give proper form to the head of the nail, as clearly shown in Figs. 10 and 12.

11 is the beveler upon which the point of the nail is flattened. It is provided for this purpose with an inclined surface 12 upon its upper face, which practically forms a part of the anvil. The anvil and beveler are seated in the same recess and secured in position by the set-screw 13. The height of the beveler is regulated by means of the set-screw 14.

I will now proceed to describe the dies employed in forming the sides of the nail.

F is the movable die, secured to the striking-hammer 15, said hammer swinging upon centers 16 16, adjustably secured in the cross-heads 17. The striking-hammer and die are of the usual construction, being similar to those described in Patent No. 399,226.

G is the pitman for operating the striking-hammer. It is formed of two parts 18 and 19, secured together by bolts, as shown in Fig. 8. The upper end of the pitman is turned to receive journal-boxes 20, which surround the eccentric upon the main shaft, by means of which the pitman is actuated, and is provided with a cap 21 for holding the several parts in position. The lower end of the pitman G is bored out endwise to receive the noddle-pin box 22, the lower half of which forms a cap. The socket 23, formed in the lower box, receives the ball 24 on the arm 25 of the striking-hammer. The revolution of the eccentric upon the main shaft, through the medium of the pitman G, causes the striking-hammer to deliver the blow at proper intervals upon the side of the nail, the face of the die F, secured to the said hammer, being ground to impart the desired shape to one side of the nail as it lies upon the anvil.

H is the stationary die, set in an opening in the die-block at an angle of about twenty-five degrees and secured in position by set-screws 26 and 27. The vertical face of this die is ground to conform to that of the movable companion die F, the two dies F and H uniting to impart the desired shape to the sides of the nail, as shown in Figs. 3 and 13 of the drawings.

I I are the shearing-dies, consisting of two steel bars set at an angle in recesses formed in the upper part of the die-block and secured in position by the cap or plate 29 and bolt 30. These dies meet and are beveled at their forward ends, forming a wedge-shaped cutting-edge, through which the point of the nail is forced, as will presently be shown, thereby shearing and finishing the same. The shearing-dies are adjusted by means of set-screws 31.

J is the lower cutter for severing the finished nail from the nail-rod. It is formed of a bar of steel set in a recess formed in the die-block and is inclined at an angle of about thirty degrees. The upper end 32 of this cutter is ground to present a square cutting-edge to the nail-rod just in front of the finished nail after said nail has been lifted from the anvil and brought in position over the shearing-dies by the action of the nose-piece to be presently described. The recess 33, (see Fig. 11,) in which the lower cutter J is secured, is wedge-shaped, the cutter lying against the front face, while the remainder of the recess is filled by the securing-wedge 34'. The lower end of the wedge 34' extends beyond the side face of the die-block E, and is provided with a flat head 35, through which pass set-screws 36 and 37. The former, screwing into the side face of the die-block, serves to force in the wedge, while the latter, bearing against said face, serves to draw the wedge out, the two serving as a ready means of adjustment for the wedge. The cutter J is further secured by the set-screw 38.

K, Figs. 10 to 17, is the punch-carrier, and L is the punch, whose office is to force the finished nail down between the shearing-dies I and upon the edge 32 of the lower cutter J, thereby shearing the point and severing the nail from the nail-rod.

The punch-carrier K slides vertically between V-shaped guides 33 and 34, set in a vertical opening in the die-block E. The guide 33 is stationary, while the guide 34 is adjusted by means of set-screws 35. The upper horizontal portion of the punch-carrier is slightly offset from the lower vertical portion, forming a head, which is provided with a horizontal dovetailed recess for the reception of the punch-holder M.

The punch-holder M is formed in two parts 36 36, secured together by screws and recessed at their forward ends to receive the punch L, said punch being passed through the recess and securely clamped by means of the bolt 37, as clearly shown in Figs. 14 and 16. The horizontal adjustment of the punch in the punch-holder is effected by means of set-screws 38, which bear against the rear ends of horizontal gibs 39, lying in the dovetailed recess on either side of the punch-holder M. The forward ends of gibs 39 bear against the block 40, which is in contact with punch L. The block 40 is seated in a vertical recess 41 in the punch-carrier, said opening being sufficiently large to allow for the necessary adjustment of the punch. Block 40 is reduced at its central portion, leaving heads at either end, against which the gibs bear, and which also serve to retain the block 40 in position, as shown in Figs. 14 and 16. The screw 42 acts in opposition to screws 38 in drawing the punch L and block 40 back firmly against the ends of gibs 39, the whole being secured in the adjusted position by set-screws 42'. The lower portion of the punch-carrier is provided with a vertical dovetailed recess 43, within which slides the vertical extension of the L-shaped roller-arm 44, the punch-carrier being vertically adjusted on said extension by means of set-screw 45. The horizontal extension of arm 44 is provided with a roller 46, which contacts with the upper edge of the cam 47 on counter-shaft D. (See Fig. 6.)

48 is a lever pivoted between ears 49 at the rear end of the machine and provided at its forward end with a roller 50, which contacts with the lower edge of cam 47. Lever 48 is connected near its free end with the L-shaped arm 44 of the punch-carrier by means of the link 51. It will thus be seen that when the cam 47 revolves the contact of roller 46 on its upper and roller 50 on its lower edge will impart a positive motion, both up and down, to the punch-carrier K.

N, Figs. 10 and 13, is the stationary guide, which serves to hold the nail in position over the shearing-dies before the descent of the punch L. It is secured to the upper face of the die-block E by bolt 52 and adjusted by set-screw 53. The face of this guide adjacent to the punch L is ground to conform to the shape of the said punch, a horizontal section of which is shown in Fig. 10.

O is the movable guide, which acts with the stationary guide N to hold the nail in position. It is capable of both horizontal and vertical movement in order to clear the nail-rod while the latter is being transferred from the anvil to its position over the shearing-dies I. The movable guide O is secured at its rear end to the upper end of the vertical rod 54, sliding in suitable bearings 55 upon the rear end of the machine. The lower end of rod 54 is embraced by the forked end of a lever 56, said lever being held in place by adjusting-nuts 57, and pivoted at its opposite end between ears secured to the cross-head 17. (See Fig. 6.) The lever 56 is provided midway of its length with a roller 58, which contacts with a cam 59 on the counter-shaft D. It will be seen that the movable guide is drawn down at proper intervals against the tension of a coiled spring 60 by the revolution of cam 59. Movable guide O also swings horizontally upon the rod 54, being connected near its center by the horizontal link 61 with the upper end of the lever 62, pivoted at 63, and carrying at its lower end a roller 64, which contacts with a cam-surface 65 on the inner face of the large cam-wheel 66, secured to the outer end of the counter-shaft D. The cam 65 acts against the tension of the nut-spring 69, secured to the lower end of the vertical rod 54 and bearing against the side of the lever 56 and serves to bring the movable guide to its normal position. The end of this guide adjacent to the punch is also ground to conform thereto, the lateral motion of movable guide O being limited by the set-screw 68 on lever 62.

P, Figs. 10 and 13, is the former, upon which the nail is straightened after being severed from the nail-rod and forced between the shearing-dies I. It slides in a dovetailed recess in the upper face of the die-block E, and is provided with a laterally-extending stem 70, which passes through the plate 71, secured to the standard 1. A coiled spring 72, is sleeved upon the stem 70 between the plate 71 and the former P, which serves to return the latter to its position under the shearing-dies after being drawn out to allow the finished nail to drop out through the opening 72' in the die-block E.

The former P, is operated by the lever 73, pivoted at its center to the upper end of the stem 74, which stem passes down through the die-block E and is provided with a forwardly-extending arm 75, carrying roller 76, which contacts with the cam 77 on the counter-shaft D.

Q is the scraper for removing the waste from the shearing-dies I. It consists of a thin bar of spring metal secured at its rear end to the die-block. The forward end of the scraper is flattened horizontally and bent to lie in position over the upper surface of the shearing-dies. The rear end of lever 73 is provided with a set-screw 78, the head of which bears against the scraper Q. It will be seen that the movement of the lever 73 serves to draw back the former, allowing the finished nail to fall, and also advance the scraper over the shearing-dies, removing the waste.

79 is a flat spring secured to the rear face of the die-block, and extending forward along the inner face of the same is bent upward and provided with a lateral extension 80, upon which the nail-rod rests, the tension of spring 79 serving to raise the nail-rod from the anvil after receiving the blow from the roller-hammer, and bringing it into position for the side stroke of the movable die E. The tension and height of the spring 79 is regulated by a set-screw 81, passing through a lug 82 on the die-block E.

R, Figs. 18, 19, and 20, is the nose-piece for guiding the end of the nail-rod S and holding it in proper position for forging and finishing the nail. The nose-piece is of the well-known form, its sides converging toward the rear end to fit closely around the nail-rod, though allowing said rod to slide freely therein. The nose-piece R is secured by bolts to the nose-piece holder 83, which is pivoted through ears 84 by a bolt 85 to the upper end of the nose-piece carriage 86. The nose-piece carriage is pivoted at its lower end between adjustable centers 87, secured to the side brace 88 of the machine, and is given an oscillating motion by means of an adjustable link connection 89 with the outer arm 90 of lever 91. The lever 91 is pivoted at 92 between ears formed on the brace 88 and is formed with two arms 90 and 93, extending one on either side of the large cam-wheel 66. The arm 93 is provided at its upper end with roller 94, which contacts with the cam-surface 95 on the inner face of the cam-wheel, while the lever 90 carries near its center the roller 96, which contacts with the cam-surface 97 on the outer surface of the cam-wheel 66.

In order to compensate for wear, the roller 96 is not secured directly to arm 90, but between the ears formed upon the upper end of the flat spring-bar 98, which bar is bolted to the arm 90. A set-screw 99, passing through arm 90 and against the free end of spring-bar 98, serves to adjust the roller 96.

It will be seen that the revolution of the cam-surfaces 95 and 97, through the medium of lever 91 and link 89, causes the nose-piece carriage to oscillate on centers 87.

As before stated, the nail after being forged upon the anvil is lifted by the nose-piece up over the stationary die and into position over the shearing-dies. This is accomplished in the following manner: Near the lower end of the nose-piece carriage 86 is pivoted the bell-crank lever 100, the upper end of which is connected by adjustable link connection 101 with lever 102, pivoted at 103 between ears secured near the rear end of the machine. Lever 102 is provided near its center with roller 104, which contacts with the cam-surface 105 on the outer face of cam-wheel 66. The lower or horizontal arm of bell-crank lever 100 is pivoted to the vertical rod 106, the upper end of which is forked to embrace the stud or pin in the nose-piece holder.

It will be seen that the revolution of the cam 66 by means of the mechanism just described first elevates the nose-piece above the plane of the stationary die and then swings the entire nose-piece carriage laterally in order to bring the nail into position over the shearing-dies, the guard $d$ on the roller-hammer disk C preventing the nail-rod from lifting too high. The nose-piece is elevated against the tension of the coiled spring 107.

The grip and feeding mechanism for feeding the continuous nail-rod forward through the furnace and upon the anvil is situated at the front end of the machine and will now be described.

T designates the base-piece, extending across the front end of the machine and which supports the stationary grip 108 and the movable or feed grip 109, these grips being similar in construction. The flat spring 110 is secured at one end to the base-piece T and at its free end is provided with a cubical head 111, through which passes the horizontal bolt 112. The end of this bolt, which projects through the head 111, is provided with a vertical slot, through which passes the gripping-blade 113, chisel-edged at its lower end, which comes in contact with the nail-rod S, as shown in Figs. 3 and 6. One edge of the gripping-blade 113 enters a vertical groove 114 in the head, Fig. 24, and is clamped firmly in position after being adjusted by means of a nut 115. The flat spring 110 holds the grip firmly in contact with the nail-rod S, clamping said rod between the grip-blade and the steel plate 116, secured to the base.

117 is a lever of the first class, lying parallel with the flat spring 110, provided at its point of fulcrum with a small heel or projection 118, which enters a recess in the base-piece. The forward end of this lever is provided with a projecting step or lug extending under the free end of flat spring 110. The rear end of the lever 117 is connected by an adjustable link 119 with lever 120, pivoted to the side of the machine at 121 and carrying at its forward end the roller 122, which contacts with the cam 123 on the counter-shaft D. The levers and connecting-link just described are alike in both grips, so that only one set has been described.

It will be seen that the revolution of the cam 123, through the medium of the levers 120 and links 119, serve to operate the prying-levers 117, thereby lifting the free ends of the flat springs 110 and releasing the grip from the nail-rod at proper intervals.

The stationary grip 108 is secured directly to the base-piece T, while the feed-grip 109 is carried by the horizontal lever 124, pivoted to the base-piece at 125 and lying along the upper face thereof. The free end of this lever slides in a boxing through the side of which passes a gage-screw 126 for limiting the throw of the lever. A horizontal link 127 connects the grip-lever 124 with another lever 128, pivoted at 129 to the main frame and carrying at its lower end a roller 130, which contacts with the periphery of the large cam-wheel 66 on the shaft D. A heavy coiled spring 131, one end of which is attached to the lever 128, serves to hold the roller 130 in contact with the cam-wheel 66, which spring is provided with the well-known means for regulating the tension, as shown.

While the nail is being forged the nail-rod is held firmly by the gripping mechanism; but when the nail-rod is to be fed forward the stationary grip 108 is raised by the action of its prying-lever, as before described, allowing the rod to be carried forward sufficiently to form the next nail by the feed-grip 109. The stationary grip again clamps the nail-rod, while the movable grip is returned to its position for the next feed, the length of which is regulated by the gage-screw 126. The motion of the feed-grip forward and backward is governed entirely by cam 66 through the medium of the lever 128 and link 127. Cam 66 is provided with a series of steps 132, which causes the feed-grip to impart a series of short backward jerks to the nail-rod just after it is fed forward and simultaneously with the blows from the striking-hammer 15. These jerks are for the purpose of straightening out the nail-rod.

U is a treadle secured to the front end of the machine and connected on one side by links 133 and 119 with the pry-lever of the movable grip 109. The link 133 is slotted at its upper end at 134 to allow for the movement of the grip. It will be seen that pressure upon the treadle U will release the movable grip for inserting or withdrawing the nail-rod S. The spring 200 serves to retain the treadle in its raised position, its movements being limited by the stop 201.

The furnace for heating the nail-rod is situated in the center of the machine in such a position that the nail-rod may pass through it while traveling from the feeding to the forging mechanism.

V, Figs. 25 and 26, is the reel upon which is wound the continuous nail-rod S. It revolves upon the pin 135, secured by set-screws in the upper end of the standard 136. The rim 137 of the reel is provided upon its under face at proper intervals with lugs or projections 138, through which pass bolts 139, which secure the flange-plate 140, the other flange 141 being cast integral with the reel. To secure lightness, the flanges are cast with openings 142. In the periphery of the rim 137, at convenient intervals, are formed transverse grooves 143, said grooves also extending through the flange-plates 140 and 141. When the continuous nail-rod is coiled around the reel, binding cords or wires may be passed through the grooves 143 and around the coil, thus securing the same for transportation.

The reel is placed in front of the machine at any convenient distance.

The operation of my invention is as follows: The end of the nail-rod mounted upon the reel in front of the machine is placed in the furnace by first releasing the feed-grip by means of the foot-treadle. After the rod has received the proper temperature it is pushed through the nose-guide and the end brought upon the anvil, the forward movement being limited by the screw-gage. The nail-rod is now projecting upon the anvil just sufficiently to form a nail. The rod will be held in position by the grip-springs and guided by the nose-guide, while the nail will be forged by the combined operation of the roller-hammer, striking-hammer, and stationary die. Then the nail is drawn out to its full length. The point of it will reach the bender, where, under the action of the roller-hammer, it will receive the proper form, and at the moment the nail receives the last stroke from the striking hammer the nose-guide raises the rod and then moves it horizontally by the action of the cam-surface over the top of the stationary die and under the movable guide and punch. Then the said movable guide is drawn down on top of shearing-dies by means of the lever 56 and cam 59 and then pulled horizontally against the punch by means of lever 62 and cam-surface 65, pushing the nail against the stationary guide, which is so adjusted that the nail will be directly under the punch and over the shearing-dies. The punch is then pulled down by means of lever 48, the cam 47 severing the nail from the rod and at the same time shearing the point and pressing the nail down through shearing-dies on top of the former P, where the proper set is given to the nail, the face of said former being ground to conform to the face of the nail, which can be either curved or straight. If straight, then the face of the punch must be ground straight; but if it is desired to have a set or a curve in the nail, then the face of the punch must be ground concave and the nail will have the same form. Now the punch is raised slightly by means of the cam 47, the nail is released, the former-slide drawn out from under the stationary guide, and the nail drops to the ground through an opening in the die-block. The punch again comes down to push the nail down in case it should happen to lodge in the dies, and is then lifted up out of the dies to its resting position, as is also the movable guide, and the scrap-cleaner Q is pushed over the face of the shearing-dies to remove the waste. The instant that the nail is severed the nail-rod is moved back by means of the nose-guide mechanism to the forging position and at the same time the stationary grip-spring is released and the rod is fed automatically forward by means of the movable grip and the feeding mechanism, which pulls or straightens the rod on the first and second blows of the striking-hammer by means of jerks caused by the steps 132 on the periphery of the cam 66. The stationary grip is then let down upon the rod and the movable grip releases its hold and is thrown back as far as the screw-gage will allow by means of spiral springs. All of these movements of the feeding and cutting mechanism occur during a single revolution of the lower or counter shaft.

Having thus described my invention, what I claim to be new, and desire to secure by Letters Patent, is—

1. In a horseshoe-nail machine, the combination, with the preliminary shaping-dies, the shearing-die, a punch for forcing a blank through the latter, and means for holding said blank in position for operation thereon by said punch, the same consisting of a fixed guide, as N, and a guide, as O, movable to and from the latter, substantially as and for the purpose specified.

2. In a horseshoe-nail machine, the combination, with the preliminary shaping-dies, the shearing-die s, the former P, consisting of a bar movable horizontally relative to the shearing-die and placed below the shearing-die opening, the punch for forcing a blank through the latter and to said former P, and means to move the former P to discharge the nail from the machine, substantially as and for the purpose described.

3. In a horseshoe-nail machine, the combination, with the mechanism for preliminarily shaping a nail from a rod or stock, a shearing-die having a wedge-shaped opening for the point of the nail to be forced through, the cutter for severing the nail from said stock, a punch for forcing the blank through the shearing-die and into contact with said cutter, a former consisting of a bar beneath the die-opening and movable horizontally relative thereto, and means to move said former, substantially as and for the purpose described.

4. The combination, with the forging-die having the fixed and the movable parts for operating to form the sides of the nail, the shearing-die, the reciprocating punch for co-operation with the latter, the guides for use with said shearing-die, consisting of a fixed and a movable member, the movable nail-stock-guiding piece for moving a partially-formed nail into position for the action of the shearing-die, and the series of cams mounted on one shaft to actuate the above-enumerated movable parts, substantially as and for the purpose described.

5. In combination, the forging-die having the fixed and movable parts for forming the sides of the nail, the shearing-die, the reciprocable punch for co-operation with the latter, the guides for use with the shearing-die, consisting of a fixed and movable member, the movable nail-stock-guiding piece R, the rod-feeding mechanism, and the series of cams for actuating the above-enumerated movable parts, substantially as described.

6. In combination with a rotary hammer, the anvil, the fixed and the movable dies on the sides of the latter, the cam mechanism for moving the movable die, the shearing-dies, the punch, the cam mechanism for moving the same, the guides for use with said shearing-dies and punch, having a movable part, the cam mechanism for operating the latter, and the cam-operated mechanism for moving a blank from the anvil to the shearing-dies.

7. In combination, the rotary hammer, the anvil, the nail-side-shaping dies, the shearing-die and punch, the guide for use with these latter, consisting of a fixed member N and a vertically and laterally movable member O, the former P, immediately below the movable member, the vertically and laterally movable nose-piece R, and the rod-feeding devices, substantially as and for the purpose described.

8. In combination, the rotary hammer, the anvil, the fixed and the movable nail-side-shaping dies, the spring-actuated rod-rest 79, the shearing-die and punch, the laterally-movable scraper Q for said shearing-die, the former P beneath the shearing-die, the lever 73, engaging said former and said scraper to move them in opposite directions, the former from beneath the shearing-die and the scraper over it, and suitable means for operating said lever 73, substantially as described.

9. In combination, the nose-piece R, the vertically-movable holder 83, the carriage 86, to which the same is pivoted, the vertically-movable rod engaging said holder to raise it, and the cam, the lever 102, link 101, bell-crank 100, and rod 106 for actuating said rod.

10. In combination, the nose-piece R, the pivoted vertically-movable holder 83, the pivoted laterally-movable carriage 86, carrying said holder, the rod 106, engaging the latter to raise it, the bell-crank lever pivoted to the carriage 86 and connected to said rod and to suitable actuating mechanism to raise it, and the spring to lower said rod, substantially as described.

11. In combination with the pivoted nose-piece carriage 86, the vibratory lever 91, connected thereto, the cam for actuating the latter, and the spring-arm 98, having the cam-engaging part which is attached to said lever 91, substantially as and for the purpose described.

12. In combination with the pivoted nose-piece carriage 86, the double-armed vibratory lever 91, connected thereto, and the double cam engaging the two arms of said lever, substantially as described.

13. In combination with the nose-piece R, the pivoted vertically-movable holder 83, the carriage 86, the rod 106, engaging the holder, the bell-crank lever pivoted to the carriage and connected to said rod and to actuating mechanism, the double-armed vibratory lever 91, connected to said carriage 86, and the double cam acting on both of said arms, substantially as and for the purpose described.

14. In combination with a punch-carrier, as K, the two-part punch-holder M, having a recess for the punch, the block 40 in said recess to abut against the punch, having heads to retain the block in said recess, the parts 39, engaging said heads, the screws 38 to move the parts 39, and the screw 42, engaging the holder M, opposing the screws 38.

15. In combination with a punch-carrier K, having an offset forming a head, the punch-holder M, placed in a dovetailed recess, the gibs 39 on the upper and lower sides of said holder, the block 40 between the ends of said gibs and the punch, a screw for each gib, and a screw engaging the holder M, opposing the gib-screws, substantially as and for the purpose specified.

16. In combination, the shearing-dies, the punch, the punch-carrier K, the L-shaped arm 44, having one member connected adjustably with said carrier, and a cam engaging the other member, substantially as shown and described.

17. In combination, the shearing-dies, the punch, the punch-carrier K, having a dovetailed recess, the L-shaped arm 44, having its vertical member in said recess, the adjusting-screw engaging said member, and suitable actuating means engaging the other member of said arm, substantially as set forth.

18. In combination with the shearing-die and punch, the guide consisting of a fixed and a movable member, the vertical rod 54, pivoting the latter, the cam-actuated lever 56, connected to said rod to lower it and said member, and the cam-actuated devices connected to said member to move it laterally, substantially as and for the purpose described.

19. In combination with the shearing-die and punch, the movable guide O, the rod 54, pivoting it, the lever 62 for swinging said guide laterally, the lever 56 and spring 60 for moving it vertically, and the nut on said rod, having a spring 69, engaging said lever 56 to restore and yieldingly maintain the normal horizontal position of said guide O, substantially as described.

20. In combination, the movable guide O, the vertical rod 54, pivoting it, the lever 62 for swinging it laterally, provided with a stop-screw 68, the lever 56 and spring 60, encircling rod 54, for moving said guide vertically, and cams to actuate said levers 62 and 56, substantially as and for the purpose described.

21. In combination with the laterally-movable guide O, the vertical pivot-rod 54, the forked lever 56, and the nut on said rod adjacent to said lever, having a spring 69 engaging the same, substantially as described.

22. In combination, the gripping-blade, the flat spring 110, attached thereto and operating to force it downward, the lever 117, having a step or projection engaging the under side of said spring, the pivoted lever 124, the cam-actuated lever 128, connected to the latter by a link 127 to move said lever 124 and the gripping device forward, and a coiled spring 131, connected to the lever 128 to move said parts rearward, substantially as shown and described.

23. In combination with a rod-gripping device composed in part of a blade forced normally against the rod, the rocker-lever 117, the link 119, connecting the same to an automatically-operating lever, the treadle, the link 133, connecting the same to the link 119, and the spring for normally raising said lever, substantially as described.

24. In combination with the rotary hammer C and the anvil, the vertically-movable nail-rod-carrying device, as R, and the guard $d$, carried by the hammer C to limit the raising of the nail-rod.

In testimony whereof I affix my signature in presence of two witnesses.

DAVID F. WILLIAMS.

Witnesses:
EDWD. J. HUSSEY,
M. HUBBELL ROBSON.